United States Patent
Chen et al.

(10) Patent No.: US 9,692,515 B2
(45) Date of Patent: Jun. 27, 2017

(54) MULTIMODE OPTICAL TRANSMISSION SYSTEM AND METHOD EMPLOYING HOM-FILTER FIBER

(71) Applicant: Corning Incorporated, Corning, NY (US)

(72) Inventors: Xin Chen, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1 day.

(21) Appl. No.: 14/825,704

(22) Filed: Aug. 13, 2015

(65) Prior Publication Data

US 2017/0047997 A1    Feb. 16, 2017

(51) Int. Cl.
| | |
|---|---|
| H04B 10/2581 | (2013.01) |
| G02B 6/028 | (2006.01) |
| G02B 6/14 | (2006.01) |
| H04B 10/40 | (2013.01) |
| H04B 10/516 | (2013.01) |
| H04B 10/572 | (2013.01) |
| H04B 10/50 | (2013.01) |
| G02B 6/26 | (2006.01) |
| G02B 6/44 | (2006.01) |
| G02B 6/38 | (2006.01) |
| G02B 6/42 | (2006.01) |

(52) U.S. Cl.
CPC .......... *H04B 10/2581* (2013.01); *G02B 6/14* (2013.01); *G02B 6/268* (2013.01); *H04B 10/40* (2013.01); *H04B 10/503* (2013.01); *H04B 10/516* (2013.01); *H04B 10/572* (2013.01); *G02B 6/0288* (2013.01); *G02B 6/3846* (2013.01); *G02B 6/421* (2013.01); *G02B 6/4471* (2013.01)

(58) Field of Classification Search
CPC ..................... H04B 10/2581; G02B 6/0288
See application file for complete search history.

(56) References Cited

U.S. PATENT DOCUMENTS

| | | | |
|---|---|---|---|
| 4,998,792 A | 3/1991 | Boerstler et al. | |
| 6,154,589 A | 11/2000 | Kirk et al. | |
| 7,283,701 B2 | 10/2007 | Hallemeier et al. | |
| 2003/0031408 A1* | 2/2003 | Ota | G02B 6/14 385/28 |
| 2006/0245468 A1* | 11/2006 | Hartog | G01K 11/32 374/161 |

(Continued)

OTHER PUBLICATIONS

Corning; Corning Vascade Optical Fiber—Product Information. Oct. 12, 2013 [online], [retrieved on Oct. 7, 2016]. Retrieved from the Internet <URL: https://www.corning.com/media/worldwide/coc/documents/Fiber/ PI1445_07_14_English.pdf>.*

(Continued)

*Primary Examiner* — Nathan Curs
(74) *Attorney, Agent, or Firm* — Robert L. Carlson

(57) ABSTRACT

A multimode optical transmission system and method that employs a higher-order-mode (HOM)-filter fiber. The system includes a transmitter with a light source that generates modulated light and that has a spatially non-uniform light emission. The system also has an optical receiver with a photodetector that receives and detects the modulated light. A multimode optical fiber link that includes a multimode optical fiber optically connects the light source and the photodetector. At least one HOM-filter fiber is optically connected to the multimode optical fiber. The HOM-filter fiber is configured to gives rise to an optical loss of 1 dB or less while increasing the modal bandwidth of the system by at least 10% as compared to using only the multimode optical fiber.

22 Claims, 11 Drawing Sheets

(56) References Cited

U.S. PATENT DOCUMENTS

| | | | | |
|---|---|---|---|---|
| 2007/0081764 | A1* | 4/2007 | Deliwala | G02B 6/1228 385/29 |
| 2013/0071114 | A1* | 3/2013 | Bickham | G02B 6/0288 398/44 |
| 2013/0266033 | A1* | 10/2013 | Tan | H04B 10/2581 372/26 |
| 2015/0086161 | A1 | 3/2015 | Bickham et al. | |
| 2015/0333830 | A1* | 11/2015 | Chen | H04B 10/2581 398/178 |
| 2016/0142142 | A1* | 5/2016 | Ryf | G02B 6/14 398/55 |
| 2016/0274304 | A1 | 9/2016 | Bickham et al. | |

OTHER PUBLICATIONS

Xin Chen, Scott R. Bickham, Jason E. Hurley, Hai-Feng Liu, Olufemi I. Dosunmu, and Ming-Jun Li, "25 Gb/s transmission over 820 m of MMF using a multimode launch from an integrated silicon photonics transceiver", Optics Express, vol. 22 Issue 2, pp. 2070-2077, 2014.

Haase et al., "A mode-filtering scheme for improving the bandwidth-distance product in multimode fiber systems" Journal of Lightwave Technology, vol. 11, No. 7, pp. 1125-1131, Jul. 1993.

Sorin et al., "Convering a multimode fiber into a single-mode fiber," Photonics Society Summer Topical Meeting Series, IEEE (Jul. 8-10, 2013), pp. 256-257, 2013.

Sorin et al., "Interoperability of single-mode and multimode data links for data center and optical backplane applications," OFC/NFOEC Technical Digest 2013 (OSA), 2013.

Al-Sowayan et al., "MMF bandwidth enhancement by longitudinal displacement launch," Conference: Lasers and Electro-Optics Society, 2004; LEOS 2004; The 17th Annual Meeting of the IEEE, vol. 2.

\* cited by examiner

MULTIMODE OPTICAL TRANSMISSION SYSTEM AND METHOD EMPLOYING HOM-FILTER FIBER

FIELD

The present disclosure relates to optical transmission systems that employ multimode optical fiber, and in particular relates to an optical fiber transmission system and method that employs at least one higher-order-mode (HOM)-filter fiber.

BACKGROUND

The entire disclosure of any publication or patent document mentioned herein is incorporated by reference, including U.S. patent application Ser. No. 14/707,841 filed May 8, 2015 and PCT Patent Application Serial No. PCT/US14/64272 filed Nov. 6, 2014.

Optical fiber transmission systems are employed in data centers to establish communication between devices such as routers, servers, switches and storage devices. The optical fiber transmission system typically utilizes a trunk cable (e.g., tens to hundreds of meters long) that carries many optical fibers (e.g., twelve, twenty-four, forty-eight, etc.). Each end of the trunk cable optically connects to a breakout assembly to transition from MPO-style multifiber trunk connectors to other types of connectors, which are then interfaced with patch cords or plugged directly into equipment ports, thereby establishing an optical path between the devices. The breakout assembly is frequently housed in a break-out module.

The optical fibers used in data center applications are typically multimode optical fibers (MMFs) because the light sources in the transceivers in the optical devices are typically multimode light sources (transmitters).

Light emitted from the multimode transmitter has a distribution across the core area. For VCSEL based application, IEEE has defined the launch conditions that need to be in compliance with. The distribution is in general weighted more in certain region. The requirement for VCSEL emission for Ethernet application is that at 4.5 micron radius, the cumulated or integrated optical power from the center of the fiber core should be less than 30% of the total optical power. At 19 micron radius position, the integrated optical power should be over 86%. The MMFs are designed with the launch condition taken into consideration and the launch condition determines the bandwidth number for a given MMF. Silicon-photonics (SiPh) light sources can also have a non-uniform light distribution wherein the intensity of the emitted light is greater towards the outer edge of the light source than at the center. Depending on design and implementation of coupling optics between the transmitter output and the MMF interface, more light can be launched in the outer portion of the core of the MMF where the higher-order modes (HOMs) travel than in the desired central or inner portion.

This enhancement or "amplification" of the HOMs is undesirable because can lead to transmission problems, including a reduction in the system bandwidth. For example, for wavelength division multiplexing (WDM) applications (and in particular, coarse WDM) that operate at several different wavelengths in the range from 850 nm to 950 nm, 980 nm to 1060 nm, or 1270 nm to 1330 nm, the fiber bandwidth is more limited for light source with light spread across the whole MMF core area, thereby reducing the MMF product yield and system reach capability. In addition, MMF bandwidth is typically measured at lengths of greater than 8.8 km and more frequently at 17.6 km. The HOMs that travel in the MMF are significantly attenuated only at these long distances. Thus, the differential mode delay (DMD) measurement and the calculated modal bandwidth can differ substantially as compared to the shorter MMF lengths used in data center applications.

It would thus be advantageous to have ways of improving the performance of a multimode optical fiber transmission system without incurring the time, labor and expense of having to replace or physically alter the industry-standard MMFs.

SUMMARY

An aspect of the disclosure is an optical transmission system for transmitting data, the system including: a transmitter that generates modulated light having a wavelength between 800 nm and 1600 nm, wherein the transmitter has an emission surface with a center and an outer edge and a spatially non-uniform light emission; an optical receiver configured to receive and detect the modulated light; a multimode optical fiber link that optically connects the transmitter and the optical receiver, wherein the multimode optical fiber link includes a primary multimode fiber having a refractive index profile configured to optimally transmit light at a peak wavelength and having a diameter $D_{40}$; and at least one higher-order-mode (HOM)-filter fiber optically connected the primary multimode optical fiber and having a length of at least 5 mm, and a core diameter $D_C$ and wherein $0.6 \cdot D_{40} \le D_C \le 0.95 \cdot D_{40}$, and having a relative refractive index $\Delta$ in the range between 0.5% and 2%, wherein the HOM-filter fiber gives rise to an optical loss of 1 dB or less and an increase in modal bandwidth of at least 10% as compared to using only the primary multimode fiber.

Another aspect of the disclosure is an optical transmission system for transmitting data, the system including: a transmitter that includes light source that generates modulated light having a wavelength between 800 nm and 1600 nm, wherein the light source has a spatially non-uniform light emission; an optical receiver that includes a photodiode configured to receive and detect the modulated light; a multimode optical fiber link that optically connects the light source and the photodetector, wherein the multimode fiber link includes a primary multimode optical fiber having a refractive index profile having a diameter $D_{40}$ and configured to transmit the modulated light; and at least one higher-order-mode (HOM)-filter fiber optically connected to the primary multimode optical fiber and having a length of at least 5 mm, a core diameter $D_C$ wherein $0.6 \cdot D_{40} \le D_C \le 0.95 \cdot D_{40}$, and a relative refractive index $\Delta$ in the range between 0.5% and 2%, wherein the HOM-filter fiber gives rise to an optical loss of 1 dB or less and an increase in modal bandwidth of at least 10% as compared to using only the multimode optical fiber. In an example, the at least one HOM-filter fiber resides at least partially within a least one of the receiver and the transmitter.

Another aspect of the disclosure is a method of transmitting optical signals over an optical path of an optical transmission system. The method includes: using a transmitter, generating modulated optical signals at a wavelength in a range between 800 nm and 1600 nm, wherein the transmitter has an emission surface with a center and an outer edge and a spatially non-uniform light emission; transmitting the optical signals over a primary multimode optical fiber having a refractive index profile configured to transmit light at the wavelength, wherein the primary multimode fiber has a diameter $D_{40}$ of either 50 μm or 55 μm≤$D_{40}$≤125 μm, and wherein some of the optical signals travel in the primary multimode fiber as higher-order modes (HOMs); performing filtering of the HOMs using at least one HOM-filter fiber attached to the primary multimode fiber, wherein the at least one HOM-filter fiber has a core diameter $D_C$ in the range 0.6·$D_{40}$≤$D_C$≤0.95·$D_{40}$, a length $L_F$ in the range from 5 mm≤$L_F$≤2 m, and a relative refractive index Δ in the range between 0.5% and 2%, wherein the at least on HOM-filter fiber gives rise to an optical loss of 1 dB or less and an increase in modal bandwidth of at least 10% as compared to using only the primary multimode optical fiber; and receiving the transmitted and HOM-filtered optical signals at a receiver.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operations of the various embodiments. As such, the disclosure will become more fully understood from the following Detailed Description, taken in conjunction with the accompanying Figures, in which.

DETAILED DESCRIPTION

Figure 1A:
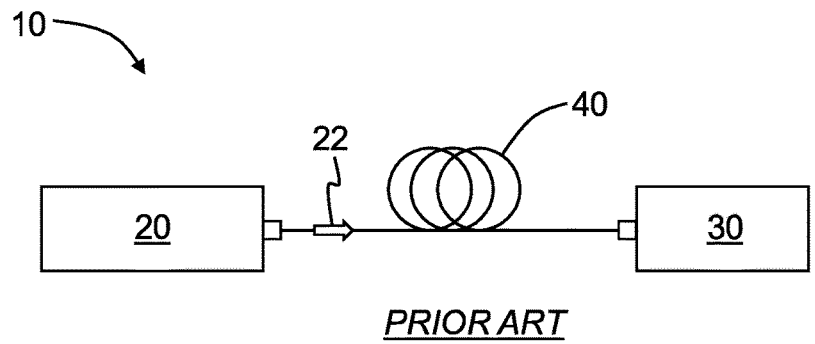
FIG. 1A is a schematic diagram of a prior art optical fiber transmission system that employs transmitter and a multimode receiver optically connected by a length of multimode optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

In the description below, the term "relative refractive index," as used herein in connection with the optical fibers and fiber cores discussed below, is defined as:

$$\Delta(r)=[n(r)^2-n_{REF}^2)]/2n(r)^2,$$

where n(r) is the refractive index at radius r, unless otherwise specified. The relative refractive index is defined at the operating wavelength, which is the wavelength where the multimode core of the optical fiber is designed to work optimally, e.g., where the differential mode delay is minimized. In one aspect, the reference index $n_{REF}$ is silica glass. In another aspect, $n_{REF}$ is the maximum refractive index of the cladding. The parameter $n_0$ is the maximum index of the index profile. In most cases, $n_0$=n(0).

As used herein, the relative refractive index is represented by Δ and its values are given in units of "%," unless otherwise specified. In cases where the refractive index of a region is less than the reference index $n_{REF}$, the relative refractive index is negative and is referred to as a "trench." The minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index. The value of $\Delta(r)$ for $r=0$ is denoted $\Delta_0$.

The alpha parameter $\alpha$ as used herein relates to the relative refractive index $\Delta$, which is in units of "%," where r is the radius (radial coordinate) of the fiber, and which is defined by $\Delta(r)=\Delta_0 \cdot [1-Q^\alpha]$, where $Q=(r-r_m)/(r_0-r_m)$, where $r_m$ is the point at which $\Delta(r)$ is the maximum $\Delta_0$ and $r_0$ is the point at which $\Delta(r)\%=0$. The radius r is in the range $r_i \leq r \leq r_f$, where $\Delta(r)$ is defined above, $r_i$ is the initial point of the $\alpha$-profile, $r_f$ is the final point of the $\alpha$-profile and a is an exponent that is a real number.

For a step index profile, $\alpha>10$, and for a gradient-index profile, $\alpha<5$. It is noted here that different forms for the core radius $r_0$ and maximum relative refractive index $\Delta_0$ can be used without affecting the fundamental definition of $\Delta$. For a practical fiber, even when the target profile is an alpha profile, some level of deviation from the ideal situation can occur. Therefore, the alpha parameter $\alpha$ for a practical fiber is obtained from a best fit of the measured index profile. An alpha parameter in the range $2.05 \leq \alpha \leq 2.15$ provides a minimum for the differential mode delay (DMD) at 850 nm and an alpha parameter in the range $1.95 \leq \alpha \leq 2.05$ provides a minimum for the DMD at 1300 nm.

The modal bandwidth (or overfill bandwidth) of an optical fiber is denoted BW and is defined herein as using overfilled launch conditions at 850 nm according to IEC 60793-1-41 (TIA-FOTP-204), "Measurement Methods and Test Procedures: Bandwidth." The minimum calculated effective modal bandwidths BW can be obtained from measured DMD spectra as specified by IEC 60793-1-49 (TIA/EIA-455-220), "Measurement Methods and Test Procedures: Differential Mode Delay." The units of bandwidth for an optical fiber can be expressed in MHz·km, GHz·km, etc., and a bandwidth expressed in these kinds of units is also referred to in the art as the bandwidth-distance product. The modal bandwidth is defined in part by modal dispersion. At the system level, the overall bandwidth can be limited by chromatic dispersion, which limits the system performance at a high bit rate.

The limits on any ranges cited herein are considered to be inclusive and thus to lie within the range, unless otherwise specified.

The symbol "μm" means "micron" or "microns", and the symbol "μm" and the word "micron" or "microns" are used interchangeably herein.

The term "HOM-filter fiber" is used to generally denote at least one fiber that performs the operation of filtering of HOMs that travel in a MMF, as disclosed herein. The HOM-filter fiber can comprise a single section of one type of optical fiber that performs HOM filtering or HOM conditioning or can comprise two or more sections of optical fiber wherein one or more of the sections perform the HOM filtering or conditioning. It is understood that an HOM-filter fiber arranged adjacent the transmitter performs mode conditioning since the HOMs being "filtered" have yet to travel within the MMF.

The term "transmitter" can mean the same as a "light source" or can mean a device that includes a light source. The term "receiver" can beam the same as a "detector" or can mean a device that includes a detector (e.g., a photodetector).

Optical Fiber Transmission System and Transmitter Characteristics

FIG. 1A is a schematic diagram of a prior art optical fiber transmission system ("system") 10 that employs a transmitter (light source) 20 that emits modulated light 22, and a receiver 30 optically connected by a primary multimode optical fiber (MMF) 40. The MMF 40 defines an optical link and has a refractive index profile designed to optimally operate around a select (i.e., "peak" or "operating") wavelength $\lambda_P$ where modal dispersion is minimum, e.g., at a wavelength in the range from 800 nm to 1600 nm. The receiver 30 is configured to receive modulated light 22 from an output end of MMF 40. The receiver 30 can be one that is used with a VCSEL-based or an SiPh-based transmitter 20.

The transmitter 20 emits modulated light 22 (i.e., modulated optical signals) having a wavelength in the range from 800 nm to 1600 nm and the systems and methods disclosed herein can have operating wavelengths in this range. The transmitter 20 can also consist of or otherwise include an SiP-based light source, which in an example emits modulated light 22 having a wavelength in the range from 1250 nm to 1650 nm. The transmitter 20 can also consist of or otherwise include a VCSEL-based light source, such as used in CWDM applications in a wavelength range of 840 nm to 980 nm or 840 nm to 950 nm. A VCSEL light source can also emit light in the wavelength range from 800 nm to 1350 nm. Thus, in an example, transmitter 20 can emit light 22 of different wavelengths in the given wavelength range, e.g., for WDM-related applications. In an example, the wavelength of the modulated light is nominally 850 nm, 1060 or 1310 nm.

Figure 1B:
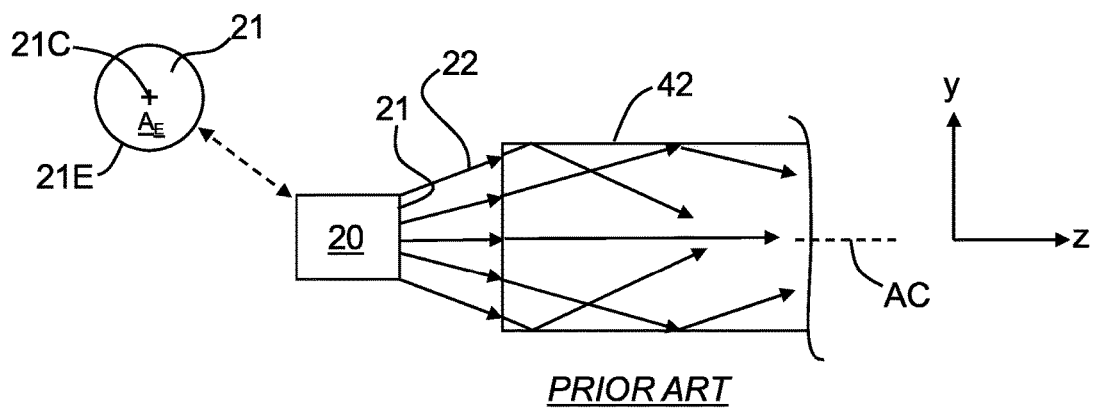
FIG. 1B is a schematic diagram of an example transmitter and the core of the MMF of FIG. 1A, illustrating the emission of light from the front surface of the transmitter and into the core of the MMF as guided modes (cladding is omitted for ease of illustration)

FIG. 1B is a schematic diagram of an example transmitter 20 and the core 42 of MMF 40, illustrating the emission of light 22 from a front surface 21 of the transmitter and into the core of the MMF. The light 22 travels in core 42 of MMF 40 as guided modes, shown by way of example as light rays. The front surface 21 of transmitter 20 has a center 21C, an outer edge 21E and an emission area $A_E$ (see close-up inset). The MMF 40 has a central axis AC. The light (rays) 22 that travel down core 42 and that remain close to axis AC have few internal reflections per unit length of fiber and thus define the lower-order modes (LOMs). The light rays 22 that make relatively larger angles with the central axis AC and that undergo multiple reflections per unit length of fiber define the higher-order modes (HOMs). Generally, for $D_{40}$=50 am MMF 40, light 22 associated with the lowest-order (i.e., fundamental) modes is confined mainly to a core radius of up to about 14 to 20 microns.

Figure 1C:
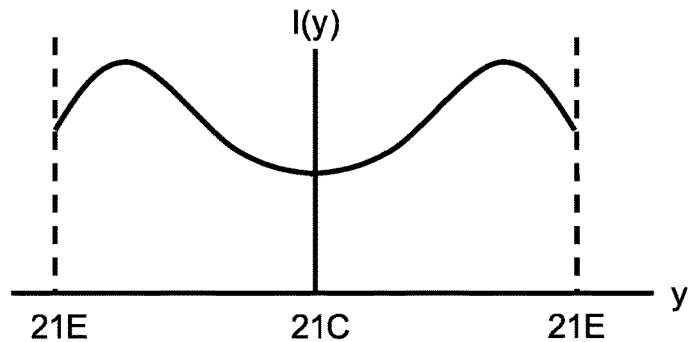
FIG. 1C is a schematic plot of the intensity (arbitrary units) versus y direction (arbitrary units) showing an example of the spatially non-uniform light emission from the surface of the transmitter, wherein the intensity is greater toward the edge of the surface than at the center.

FIG. 1C is a schematic plot of the intensity (arbitrary units) versus y direction (arbitrary units) showing an example of a spatially non-uniform light emission from the surface 21 of transmitter 20. Note that the intensity is greater toward the outer edge 21E of the surface than at the center 21C. This serves to enhance or amplify the HOMs traveling in core 42 of MMF 40 relative to the LOMs. As noted above, this is undesirable because the HOMs can substantially reduce the modal bandwidth BW of the optical transmission system.

Optical Transmission System with HOM Filtering

Standard 50 micron MMF is formed using $GeO_2$ doping. No matter how the refractive index profile is optimized, the material dispersion prevents the modal bandwidth BW from having a constant and high value over a wide range of wavelengths as desired for CWDM applications.

FIGS. 2A through 2E are schematic diagrams of examples of an optical transmission system ("system") 100 as disclosed herein. The example systems 100 are modified versions of system 10 of FIG. 1A, and respectively include at least one HOM-filter fiber 110 configured to reduce or substantially eliminate the detrimental effects of HOMs on system performance as described below. In system 100, MMF 40 and the at least one HOM-filter fiber 110 concatenated thereto constitute an optical fiber link 104. Also in the embodiments of FIGS. 2A through 2E, transmitter 20 includes a light source 24 and receiver 30 includes a photodetector 34.

Figure 2A:
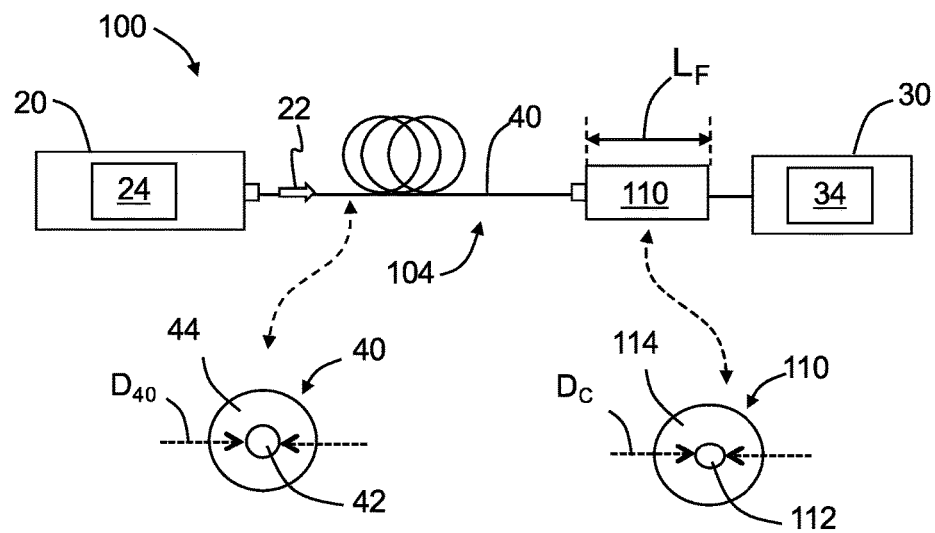
FIGS. 2A through 2E are schematic diagrams of example optical transmission systems configured to reduce the detrimental effects of HOMs by incorporating at least one HOM-filter fiber in the optical path between the transmitter and the receiver.

With reference to FIG. 2A, system 100 includes receiver 30 and a HOM-filter fiber 110 arranged between primary MMF 40 and receiver 30. The two close-up insets of FIG. 2A show cross-sectional views of an example HOM-filter fiber 110 and an example primary MMF 40. The HOM-filter fiber 110 has a central core 112 surrounded by a cladding 114. Central core 112 has a diameter $D_C$. The HOM-filter fiber also has a length $L_F$, which in an example is greater than 5 mm, and can be in the range from 0.5 m to 5 m, but would work for any reasonable length greater than 5 mm. An example of convenient range for length $L_F$ is from 5 mm to 5 cm. The HOM-filter fiber can be put into a fiber jumper cable with connectors on both ends. The jumper length is typically 0.5 to 5 m. For a short HOM-filter fiber such as about 0.5 to 2 cm, it can be put into a fiber stub type of connector, such as field mountable connector.

In an example, primary MMF 40 has the aforementioned core 42 of diameter $D_{40}$ surrounded by a cladding 44. In an example, the core diameter $D_{40}$ of primary MMF 40 is nominally 50 μm while the core diameter $D_C$ of HOM-filter fiber 110 is in the range 30 μm≤$D_C$≤45 μm while in another example is in the range 35 μm≤$D_C$≤42 μm. In other examples discussed below, primary MMF 40 has a relatively large core diameter $D_{40}$, e.g., in the range 55 μm≤$D_C$≤125 μm. Thus, more generally, the core diameter $D_C$ of HOM-filter fiber 110 relative to the core diameter $D_{40}$ of primary MMF is in the range from 0.6·$D_{40}$≤$D_C$≤0.95·$D_{40}$ or 0.85·$D_{40}$≤$D_C$≤0.95·$D_{40}$ or 0.8·$D_{40}$≤$D_C$≤0.9·$D_{40}$.

In an example where $D_{40}$=62.5 μm, the core diameter $D_C$ of HOM-filter fiber 110 can be in the range 45 μm≤$D_C$≤58 μm or in the range 45 μm≤$D_C$≤55 μm.

For the above ranges, primary MMF 40 is not limited to just single-mode operation but also includes HOMs. However, the outermost (i.e., the "highest" of the) HOMs are filtered out using HOM-filter fiber 110 in a manner that improves the modal bandwidth BW without substantially reducing the amount of optical power transmitted.

Figure 2B:
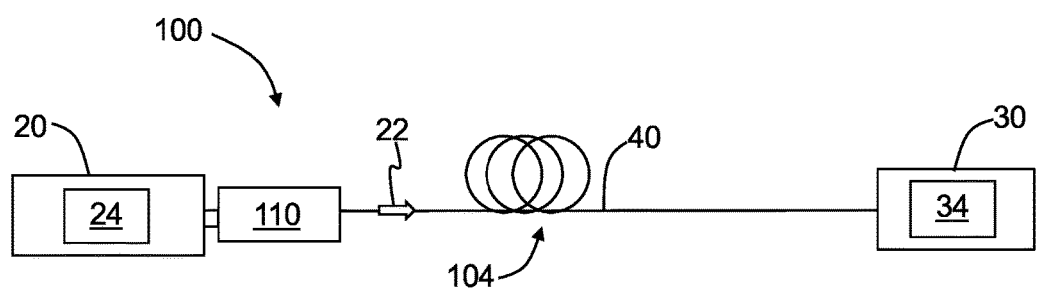

In the example system 100 shown in FIG. 2B, a single HOM-filter fiber 110 is operably disposed between transmitter 20 and primary MMF 40 and thus serves the aforementioned mode-conditioning function.

Figure 2C:
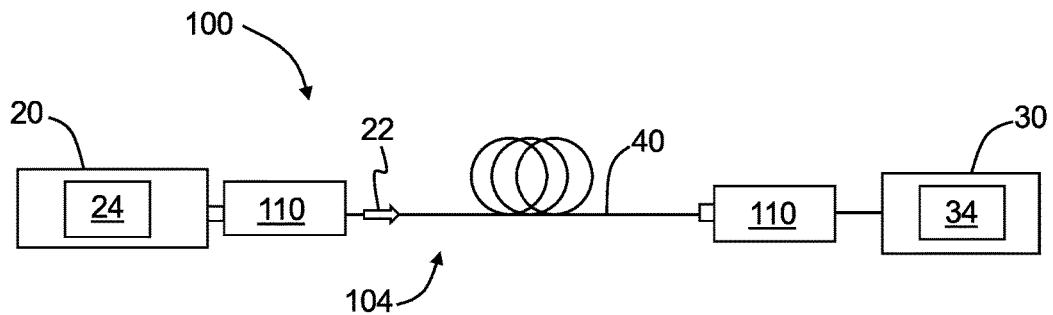

FIG. 2C is similar to FIGS. 2A and 2B and includes two HOM-filter fibers 110: one disposed between transmitter 20 and primary MMF 40 and one disposed between receiver 30 and primary MMF 40.

Figure 2D:
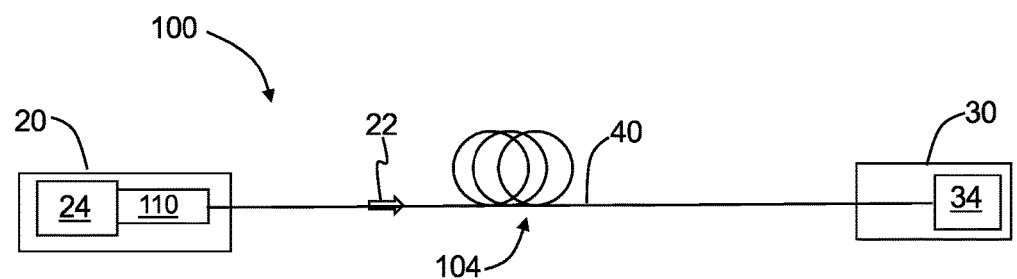
Figure 2E:
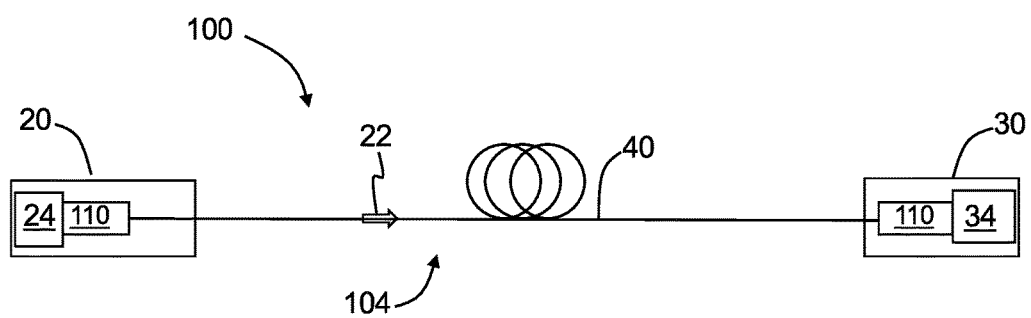

FIG. 2D is similar to FIG. 2B and illustrates an example embodiment wherein a single HOM-filter fiber 110 is arranged within transmitter 20, e.g., immediately adjacent light source 24. FIG. 2E is similar to FIG. 2C and illustrates an example embodiment that includes two HOM-filter fibers 110, with one HOM-filter fiber arranged within receiver 20 (e.g., immediately adjacent light source 24) and one HOM-filter fiber arranged within receiver 30, e.g., immediately adjacent photodetector 34. In other example embodiments, a receiver-side HOM-filter fiber 110 can reside partially within receiver 20 and/or a transmitter-side HOM-filter fiber can reside partially within transmitter 30.

As noted above, the condition $D_C$<$D_{40}$ acts to filter out the outermost HOMs that can travel in primary MMF 40. While there is some modal loss, the exemplary ranges on the core diameter $D_C$ of HOM-filter fiber 110 ensures that modulated light 22 travels over the optical path defined by optical link 104 in those guided modes that travel substantially down the center of the MMF 40 and out to the core diameter $D_C$. Consequently, only light 22 that is emitted substantially from a center portion of the core 42 of MMF 40 at the output end of the MMF is received by receiver 30. Yet, light 22 does not consist solely of the fundamental or single-mode; there remains at least some HOMs that reside within core diameter $D_C$.

In an example, HOM-filter fiber 110 can have a relative refractive index Δ in the range between 0.5% and 2%. The HOM-filter fiber 110 can include a trench in the refractive index profile that renders the fiber bending insensitive MMF, or can be a conventional MMF without the trench.

The bandwidth of a multimode fiber is limited by the differential mode delays (DMDs) among the modes propagating in the fiber. A multimode fiber has the aforementioned optimal (i.e., peak or operating) wavelength associated with a relative flat DMD and high bandwidth. However, at a wavelength that is away from this optimal wavelength, the DMDs get larger, which decreases the bandwidth. The OM4 fiber is a high grade of MMF having an effective modal bandwidth (EMB) of 4700 MHz·km at or above at 850 nm. But OM4 fiber is less optimal or far from optimal at 1310 nm due to material dispersion. The specification of OM4 fiber for its overfill bandwidth (OFL) is equal to or above 500 MHz·km.

In an example, light 22 emitted by transmitter 20 has a wavelength that is substantially the same as the optimum (i.e., peak or operating) wavelength of primary MM fiber 40. In another example, light 22 emitted by transmitter 22 has a wavelength that differs from the optimum wavelength of primary MM fiber 40. In various examples, the difference between the wavelength of light 22 emitted by transmitter and the optimum wavelength of MM fiber 40 is greater than 5 nm but less 150 nm, or greater than 10 nm but less than 100 nm or greater than 10 nm but less than 90 nm or greater than 20 nm but less than 50 nm.

Figure 3A:
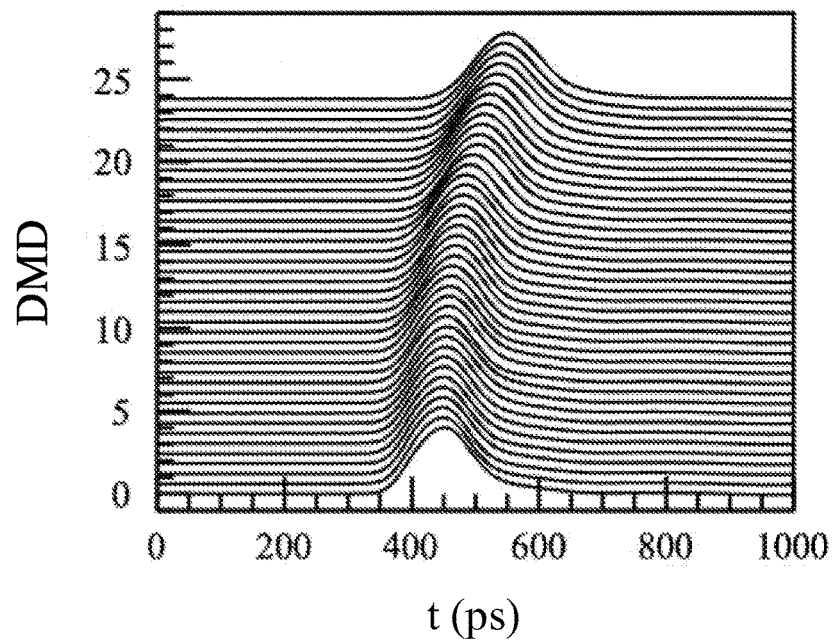
FIG. 3A is a plot of measured DMD waveforms ("DMD") versus time t (ps) for 100 m of OM4 fiber at 1310 nm, wherein different waveforms or DMD traces are for different offsets made in increments of 0.61 micron.
Figure 3B:
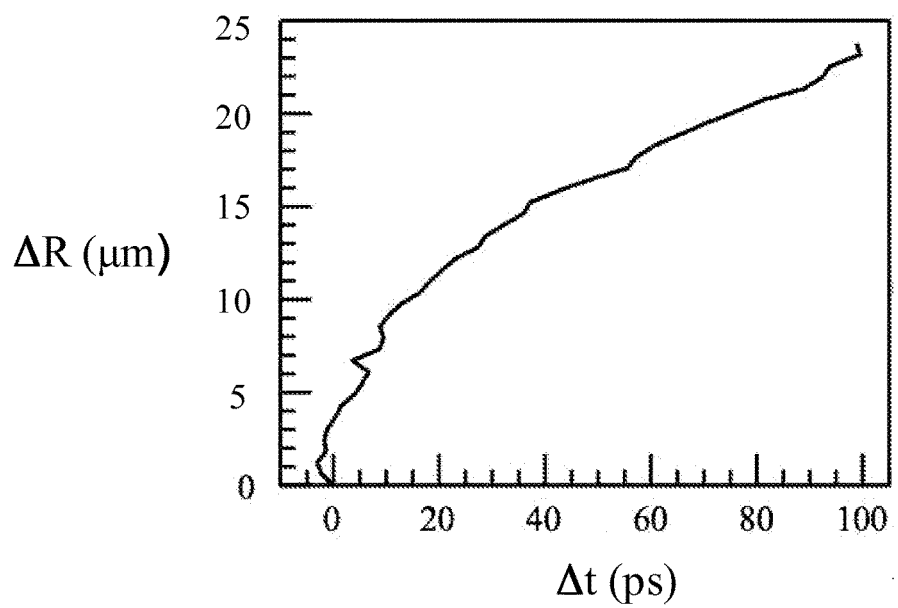
FIG. 3B is a plot of radial offset δR (μm) (y-axis) versus the time delay Δt (ps) and shows the average delay for each waveform at the given offset or radial position, and provides a measure of the centroid of the DMD delays of FIG. 3A (the curves are shifted upwards relative to one another for ease of viewing)

FIG. 3A is a plot of measured DMD waveforms ("DMD") versus time t (ps) for 100 m of OM4 fiber at 1310 nm. The different waveforms or DMD traces are for different lateral (radial) offsets, made in increments of ΔR=0.61 microns. The different DMD waveforms are shifted upwards relative to one another for the different offset increments for ease of viewing. The actual DMD measurement is taken from the baseline of each waveform. FIG. 3B is a plot of the radial offset ΔR (μm) (y-axis) versus the time delay Δt (ps) and shows the average delay for each DMD waveform at the given radial offset.

The plots of FIGS. 3A and 3B indicate that at 1310 nm the DMD centroid is "right tilt" and the delay difference between the center of the core and a given radial position R increases parabolically toward the edge of the core. In this case, if an HOM is filtered out, the modal bandwidth BW can be increased significantly. For example, if an HOM-filter fiber 110 has a core diameter of 45 micron, the modal bandwidth BW can be increased by 11% at link level. If an HOM-filter fiber 110 with a core diameter of 40 microns is used, the modal bandwidth BW can be increased by 38%. In other cases, in particular WDM applications, the difference in wavelength between the wavelength of operation and optimal wavelength may not be as dramatic as the above example, so that the improvement in modal bandwidth BW can vary.

Another example illustrates the benefit of bandwidth improvement for VCSEL based WDM application between 850-950 nm. An OM4 fiber has an optimum operating wavelength of about 850 nm. Recently proposed short-wave WDM (sWDM) applications calls for the use of OM4 fiber in the wavelength range from 850 nm to 950 nm. But because of material dispersion, the modal bandwidth of the MMF drops significantly when the operating wavelength is moved away from optimal wavelength.

Here we present the wavelength dependence of the MMF fiber around 850 nm. The radial delay change of the DMD centroid is denoted C (in unit of ns/km) and can be described by the equation for centroid delay $C(r)=[\Delta\lambda/D]\cdot(r/a)^2$, where $\Delta\lambda$ is the change (in nm) of wavelength from 850 nm, a is the core radius and r is the radial position. The coefficient D has the value of a about 286 (nm·km/ns). The equation for C(r) was obtained by modeling the DMD behavior of 1 km MMF with an alpha refractive index profile at wavelengths around 850 nm and fitting the centroid difference in the wavelength regime.

Figure 3C:
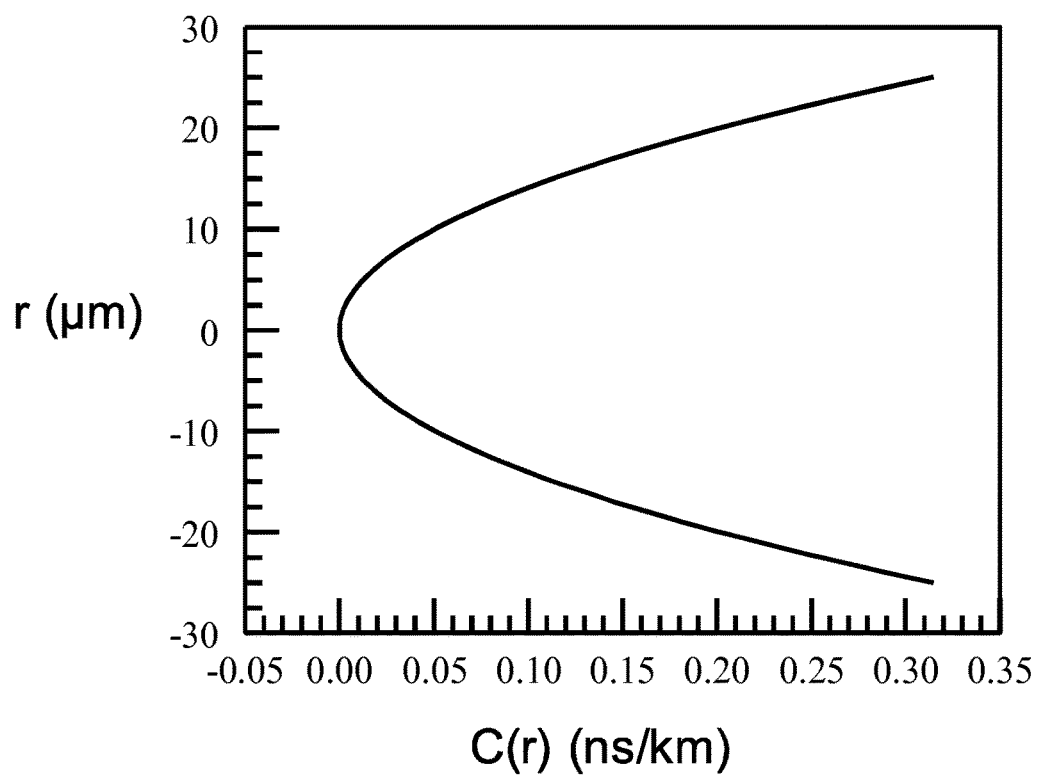
FIG. 3C is a plot of the centroid delay C(r) (ns/km) versus radial position r (μm) for an OM4 fiber operating at 940 nm.

FIG. 3C plots the centroid delay C(r) (ns/km) versus radial position r (μm) for an OM4 fiber operating at 940 nm, i.e., 90 nm away from its peak or optimum operating wavelength. It is shown that as affected by the material dispersion, the central or average modal delay is dependent on the radial position r following a parabolic function. The delays become much higher at the higher radius, i.e., near the edge of the core. The overfill bandwidth is inversely proportional to the delay difference across the fiber. By utilizing HOM-filter fiber 110, the light associated with HOMs traveling in the primary fiber 40 is blocked, thereby reducing the delay difference and resulting in a bandwidth improvement.

Using this principle, the overfill modal bandwidth improvement can be calculated for a HOM-filter fiber 110 of a given core size. For a HOM-filter fiber 110 with core diameter of 45 microns and for a diameter $D_{40}$=50 microns for the primary MM fiber 40, the overfill bandwidth of optical fiber link 104 would be improved by 23%. For a HOM-filter fiber 110 with core diameter of 40 microns, the overfill bandwidth of optical fiber link 104 would be improved by 57%, albeit with greater attenuation.

Depending on the detailed situation, the modal bandwidth BW can be improved by 5% or more, or 10% or more, or 15% or more, or 20% or more, 30% or more. In an example, the improvement in modal bandwidth is between 5% and 50% or between 10% and 40%.

The systems and methods disclosed herein can be applied to traditional VCSEL applications at 850 nm as well as to SiPh applications at around 1300 nm. It can also be applied to other wavelengths, for example 980 nm or 1060 nm for long-wavelength VCSELs. Thus, the method is generally applicable for wavelengths λ in the range from 800 nm to 1600 nm and for various data rates, e.g., in the range from 1 Gb/s to 50 Gb/s. Likewise, the HOM-filter fiber 110 can take on various forms, e.g., can be in the form of a jumper fiber, MMF used in breakout module or fan-out harness, or as a stub fiber in a connector. Such examples are presented further below.

Figure 4A:
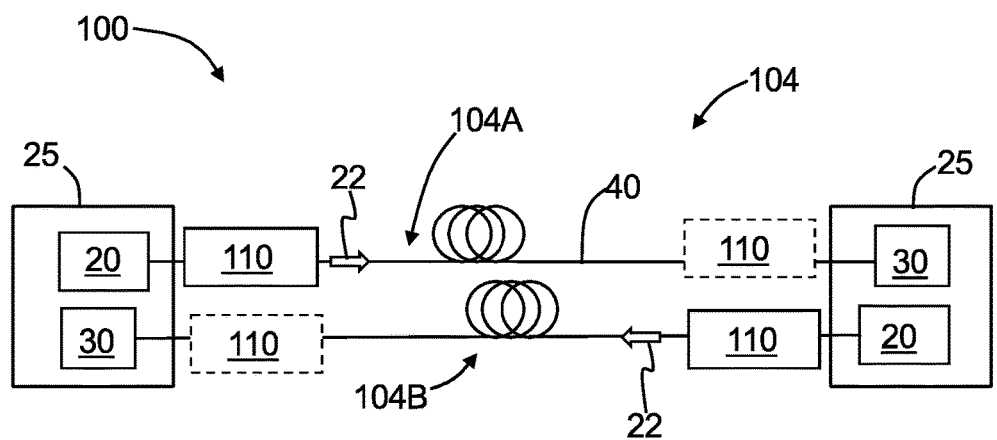
FIG. 4A is similar to FIGS. 2A through 2C and illustrates an example optical transmission system that has two optical fiber links, one for each of the two directions of optical communication.

FIG. 4A is similar to FIGS. 2A through 2C and illustrates an example of system 100 that includes two separate optical links 104A and 104B, one for each of the two directions of optical communication. The example system 100 of FIG. 4A utilizes two transmitters 20 and two receivers 30, with one transmitter and one receiver being part of a transceiver 25, with transceivers residing at each end of system 100. The two optical fiber links 110A and 110B each have a primary MMF 40 with at least one HOM-filter fiber 110 operably connected to the primary MMF.

Figure 4B:
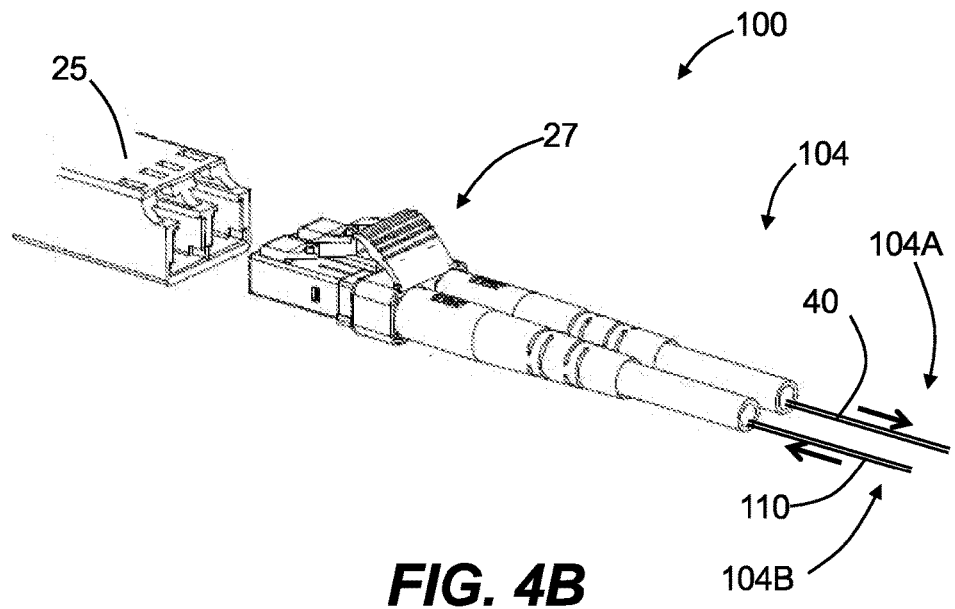
FIG. 4B is a close-up elevated view of one end of the optical transmission system of FIG. 4A and illustrates an example two-fiber transceiver and a pair of duplexed single fiber connectors that terminate the end of a two-fiber optical fiber patch cord.

With reference to FIG. 4B, in an example, the optical fiber links 104A and 104B can be terminated at their respective ends with a two-fiber connector 27 that mates with a corresponding transceiver 25. In an example, connector 27 can be an MT-RJ® connector or a duplexed single-fiber connector, such as an SC or LC connector, and transceiver 25 can be configured to mate with the particular type of connector used. Transceiver 25 and connectors 27 can also be parallel optic transceiver and connectors.

In an example, at least one HOM-filter fiber 110 is included at least partially within each two-fiber connector 27, as illustrated in FIG. 4B. Using the same type of HOM-filter fiber 110 allows for forming optical fiber links 104A and 104B without the need to differentiate between fiber types, thereby simplifying the configuration and management of system 100.

In FIG. 4A, the dashed-line boxes for HOM-filter fibers 110 illustrate optional example embodiments where each optical fiber link 104A and 104B includes two HOM-filter fibers 110 at each end of the respective primary MMFs 40. This configuration is amendable to using duplex or two-fiber jumpers, as explained below.

Example Large-Core MMF

In an example embodiment, primary MMF 40 has a core diameter $D_{40}$ in the range 55 μm≤$D_{40}$≤125 μm. In an example, for diameter $D_{40}$=125 μm, primary MMF 40 has no cladding 42. In an example, the relative refractive index Δ can be in the range of 0.5% to 2.5%. The large-core MMF 40 can be used in the optical transmission systems and methods disclosed herein along with the appropriate HOM-filter fiber 110.

In an example, a large-core MMF 40 with $D_{40}$=110 μm and an outside diameter of 125 μm was made using draw tensions of 50 g, 100 g and 150 g. The modal bandwidth BW of the example larger-core MMF 40 was measured, assuming only 50-micron portion of core 42 was used. An Ardent ModCon conditioner measurement system was used to launch the light into the example large-core MMF 40. A MMF with a core diameter of 50 microns was butt couple to an ouptut end of the example large-core MMF to serve as the HOM-filter fiber 110. In this case, the 50 micron core fiber served as the HOM-filter fiber 110 for the main fiber 40 having a large core of 110 microns diameter. The transmitted light was detected at a photo-receiver.

Figure 5A:
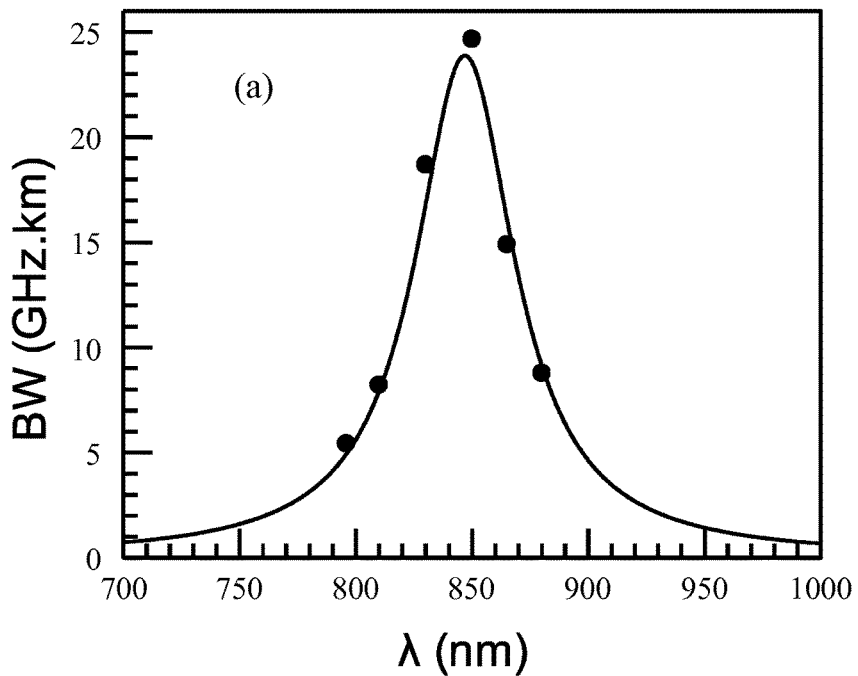
FIGS. 5A and 5B are plots of the measured modal bandwidth BW (GHz·km) versus wavelength (nm) obtained for example large-core MMFs each having a core diameter of 110 microns and an outer diameter 125 microns and that respectively were formed using a 50 g draw tension (FIG. 5A) and a 100 g draw tension (FIG. 5B)
Figure 5B:
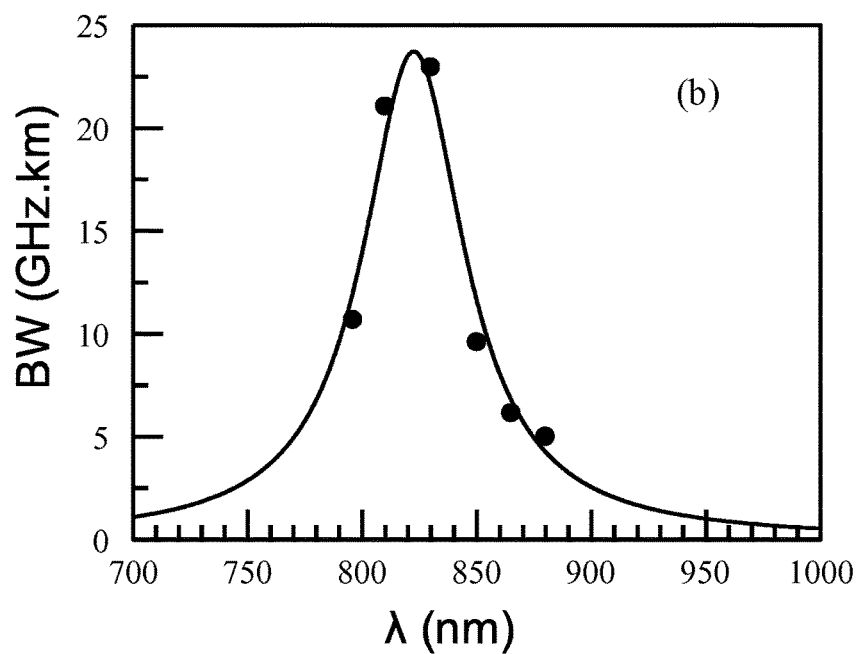

FIGS. 5A and 5B are plots of the measured modal bandwidth BW (GHz·km) versus wavelength (nm) obtained for example large-core MMF ($D_{40}$=110 μm, outside diameter of 125 μm) formed using a 50 g draw tension (FIG. 5A) and a 100 g draw tension (FIG. 5B). The measurements of the two example large-core MMFs 40 show that each fiber has an extremely high peak modal bandwidth BW around 25 GHz·km. In addition, the high modal bandwidth BW is maintained over a wavelength range of over 100 nm.

The coupling loss due to the re-coupling into the 50 micron core MMF using 200 m, 300 m and 500 m of the large-core MMF was also measured and was found to be substantially constant at 1.9 dB to 2.0 dB. The coupling loss is thus largely length independent, which suggests the loss is due to the mode field mismatch. The core diameter $D_{40}$ can be made smaller, e.g., in the range from 70 µm to 80 µm to reduce the coupling loss. In an example, a bridge fiber with a core diameter $D_B$ between $D_{40}$ and $D_C$ can be disposed between the large-core MMF and the HOM-filter fiber 110 to reduce the mismatch of the mode field.

Further Example Optical Transmission Systems and Links

Figure 6A:
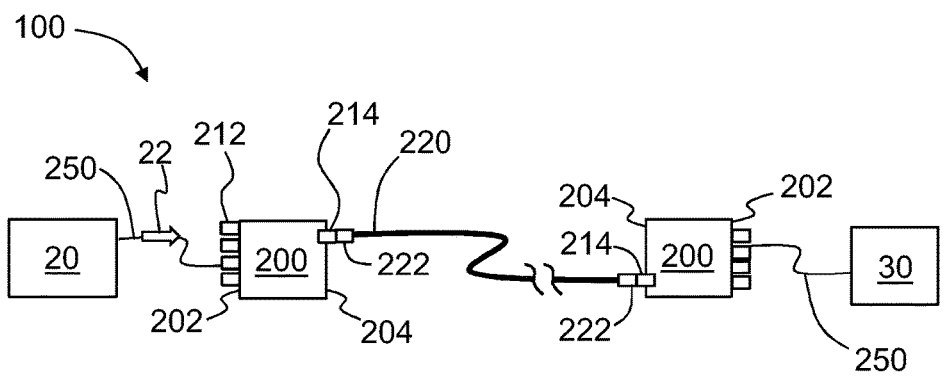
FIG. 6A is a schematic diagram of an example optical transmission system wherein the optical path between the transmitter and the receiver includes two breakout modules optically connected by a trunk cable, with the modules optically connected to the transmitter and receiver with respective jumper cables.

FIG. 6A is a schematic diagram of an example system 100 wherein the optical path between transmitter 20 and receiver 30 includes two breakout modules 200 optically connected by a trunk cable 220. Breakout modules 200 include front and back ends 202 and 204. Trunk cable 220 also includes connectorized ends 222 that are respectively connected to adapters 214 at the back ends 204 of the two breakout modules 200. Connectorized jumper cables or "jumpers" 250 are used to connect transmitter 20 to adapters 212 at the front end 202 of the adjacent breakout module 200. Likewise, jumpers 250 are used to connect receiver 30 to adapters 212 the front end 202 of the adjacent breakout module 200.

Figure 6B:
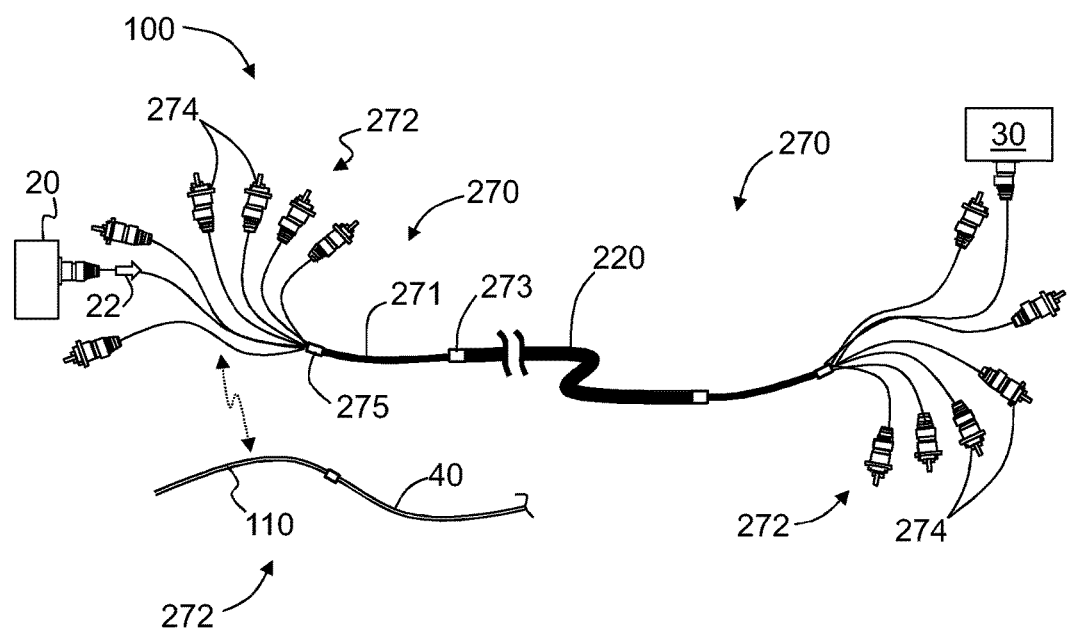
FIG. 6B is a schematic diagram of an example optical transmission system wherein the optical path between the transmitter and the receiver includes a trunk cable connected to two breakout harnesses that include two connectorized cable sections that respectively attach to the transmitter and receiver.

FIG. 6B is similar to FIG. 6A but instead of breakout modules 200, system 100 instead includes two breakout harnesses 270, e.g., MPO to LC harnesses. The breakout harness 270 includes connectors 274 that obviate the need for jumpers 250 by providing for direct connection to equipment ports.

Figure 6C:
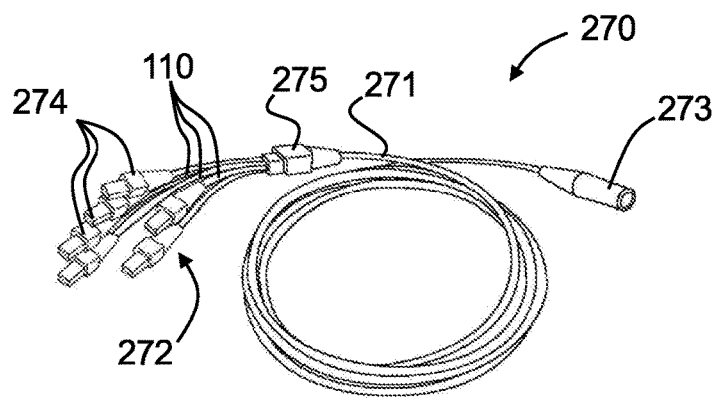
FIG. 6C is an example breakout harness that includes cable sections that each has a section of HOM-filter fiber.

FIG. 6C shows an example of a breakout harness 270 of FIG. 6B. With respect to FIGS. 6B and 6C, breakout harness (also called a "fan out" cable) 270 includes a main portion 271 that carries (e.g., encases) multiple primary MMFs 40. The main portion 271 includes a furcation point 275 wherein primary MMFs 40 from main portion 271 break out at a furcation location 275 into branches or legs 272 having one or more MMFs terminated by connectors 274. Connectors 274 can be, for example, single-fiber connectors, duplex LC-type connectors, etc. At least a portion of legs 272 includes respective HOM-filter fibers 110. One end of main portion 271 opposite furcation location 275 is terminated by at least one main connector 273. The configuration of FIG. 6C provides breakout harness 270 with built-in modal-conditioning capability. In an example, breakout harness 270 converts MPO connector input at connector 273 with LC connector output at connectors 272. Other connector formats at either end of breakout harness 270 can also be employed.

Figure 7:
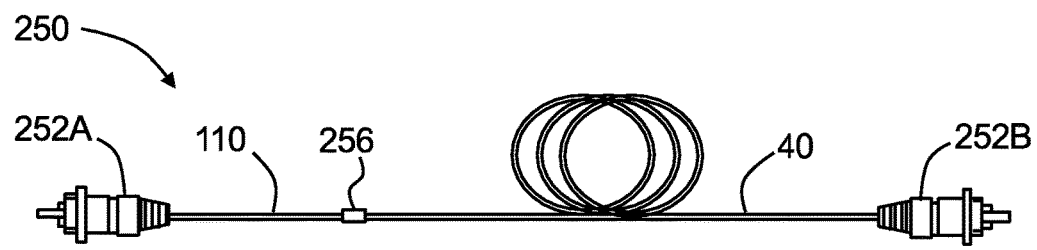
FIG. 7 is a side view of an example jumper that includes a section of HOM-filter fiber.

FIG. 7 is a close-up view of an example jumper 250. Jumper 250 includes connectors 252A and 252B at opposite ends. Jumper 250 includes a section of HOM-filter fiber 110 adjacent connector 252A, while the remaining part of the jumper includes MMF 40. The two fibers are shown joined at a location 256, which in an example includes a splice. Jumper 250 thus has built-in HOM-filtering capability. In an example, jumper 250 includes indicia (not shown) that shows where HOM-filter fiber 110 is located. In examples, jumper 250 includes two-fiber connectors 252, such as MT-RJ® connectors or duplexed single-fiber connectors, such as SC or LC connectors (see, e.g., FIG. 4B).

Figure 8A:
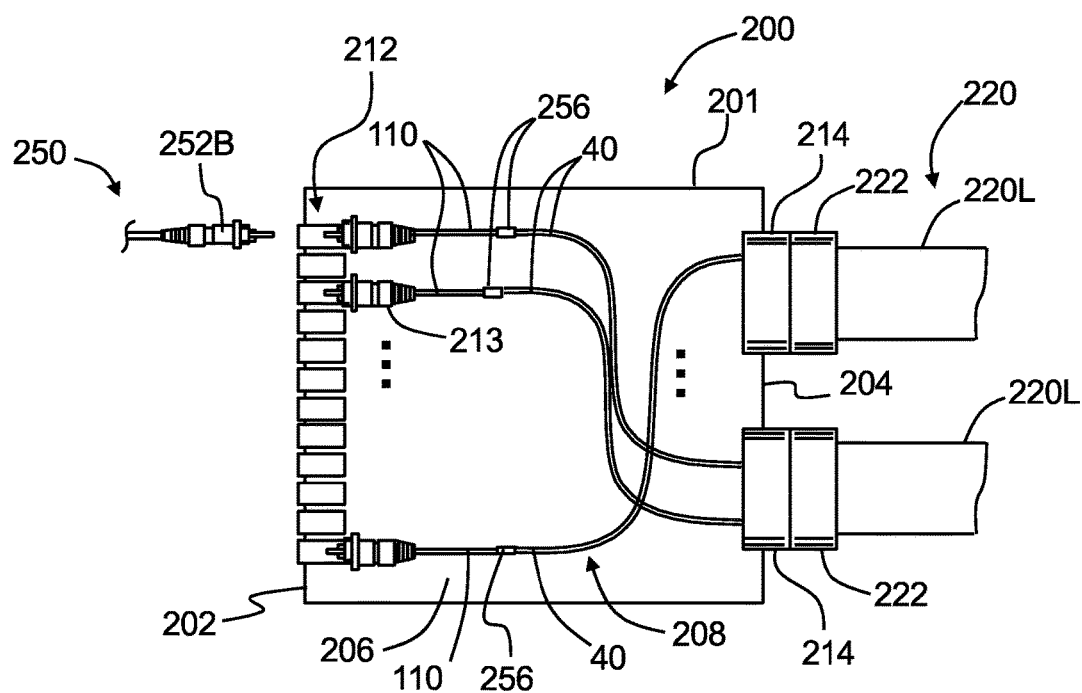
FIG. 8A is a partial cut-away view of an example breakout module wherein the fiber array within the module includes sections of HOM-filter fiber.

FIG. 8A is a cross-sectional view of an example breakout module 200 that includes a module housing 201 that defines front end 202, back end 204 and an interior 206. Breakout module interior 206 houses fiber arrays 208. The front end 202 of breakout module 200 includes one or more front-end adapters 212, and the back end 204 of breakout module includes one or more back-end adapters 214. Front-end adapters 212 and back-end adapters 214 can be MPO adapters. In an example, front-end adapters 212 can be configured as parallel optic adapters, LC adapters, SC adapters, MT-RJ® adapters, etc.

Fiber array 208 is made up of HOM-filter fibers 110 optically connected to (e.g., concatenated to) respective primary MMFs 40, with the ends of the HOM-filter fibers terminated with connectors 213, which are inserted into front end adapters 212. The free ends of the primary MMFs 40 are terminated with connectors (not shown) inserted into back-end adapters 214. Fiber array 208 is configured to provide a select optical connection configuration between the front-end and back-end adapters 212 and 214. An example of such a select optical connection configuration is described below.

The trunk 220 is shown by way of example in FIG. 8A as including two multifiber legs 220L that are respectively optically connected to the two back-end adapters 214 via connectors 222. Likewise, jumpers 250 are optically connected to the front-end 202 of module 200 via front-end adapters 212. Thus, the front-end and back-end adapters 212 and 214 respectively serve to provide connection locations for jumper connectors 252B and trunk connectors 222 to complete the optical path between the transmitter 20 and receiver 30, as shown in FIG. 2A.

Other configurations of module 200 are possible, e.g., a single back-end adapter 214 that includes all of the necessary fiber connection locations, different locations and/or orientations for the front-end adapters 212, etc. The configuration of FIG. 8A provides module 200 with built-in modal-conditioning capability.

Figure 8B:
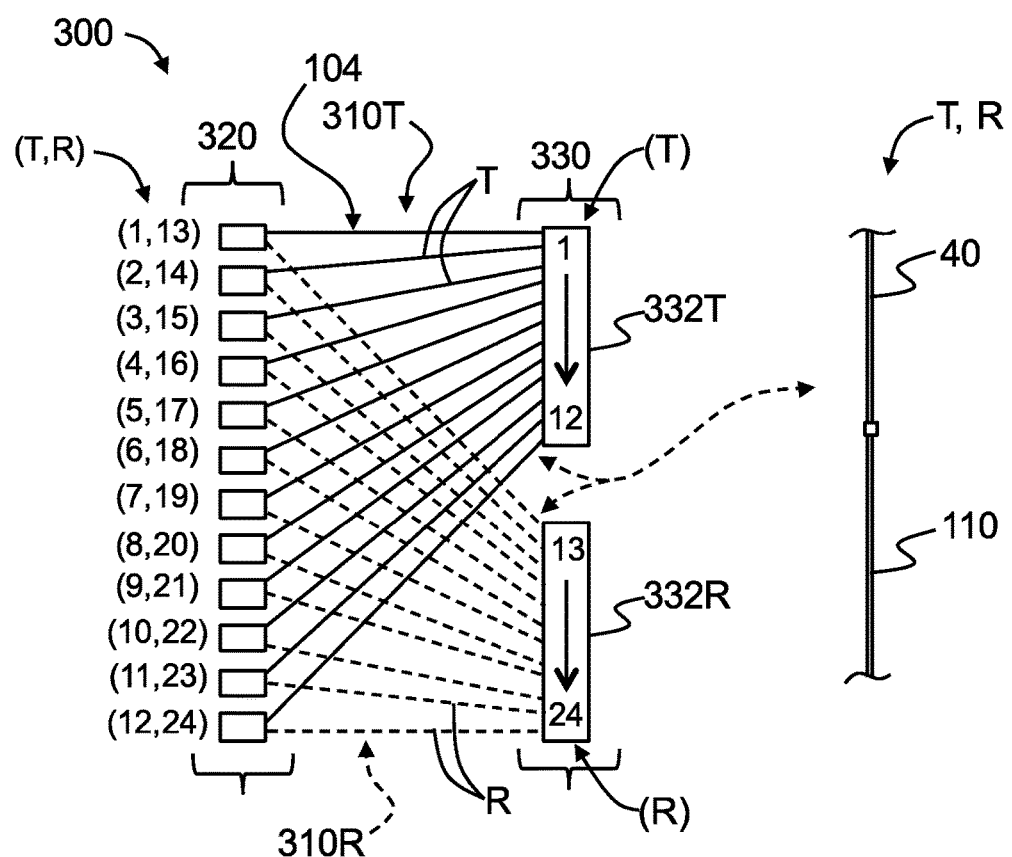
FIG. 8B is a schematic diagram of an example modal-conditioning fiber assembly that includes two fiber arrays each made up of modal-conditioning fibers, wherein the two fiber arrays define select pairings of the modal-conditioning optical fibers from the two modal-conditioning fiber arrays.

FIG. 8B is a schematic diagram of an example embodiment of a HOM-filter fiber assembly ("fiber assembly") 300. Fiber assembly 300 can be embodied as the above-described breakout module 200 or as the above-described breakout harness 270. Fiber assembly 300 is made up of two fiber arrays 310T and 310R that respectively include transmit and receive optical fiber links 104, respectively denoted as "T" (solid lines) and "R" (dashed lines). Each transmit and receive optical fiber link T and R is formed from a section of MMF 40 and HOM-filter fiber 110, as illustrated in the close-up inset view on the right-hand-side of the Figure.

The fiber assembly 300 is shown by way of example as including N=24 fibers, with each fiber array 310T and 310R having N/2=12 fibers T and R. In general, N is an even number greater than 2, and the choice of N=24 is simply by way of illustration. In the example, fibers T are numbered 1 through 12 and fibers R are numbered 13 through 24. More generally, for N total fibers, fibers T are numbered 1 through N and fibers R are numbered (N/2)+1 to N.

Fiber assembly 300 includes on one side (the left side) first connection locations 320 where one side of the transmit and receive optical fiber links T and R are terminated in pairs, denoted as (T,R). In example embodiments, the paired connection locations 320 can be defined by one or more connector adapters or one or more fiber connectors, such as duplex connectors, two-fiber connectors, etc., as discussed above in connection with breakout module 200 and breakout harness 270.

Fiber assembly 300 also includes on the other side (the right side) second connection locations 330 where the other side of the transmit and receive optical fiber links T and R are terminated in groups or sections, as denoted by (T) and (R). In an example embodiments, connection locations 330 can be defined by one or more connector adapters or one or more fiber connectors, etc., as discussed above in connection with breakout module 200 and breakout harness 270.

In the example shown, two multifiber connectors 332R and 332T are employed that respectively define connection locations 330 for receive and transmit optical fiber links R and T at the right side of fiber assembly 300. In another example, a single connector 332 is used that includes a first row or plane (group) of connection locations for receive optical fiber links R and a second row or plane (group) of connection locations for transmit optical fiber links T. Thus, connection locations 330 serve to separate and group receive and transmit optical fiber links R and T.

In various examples, HOM-filter fibers 110 can reside at anywhere between connection locations 320 on the left side of fiber array 300 and connection locations 330 on the right side of the fiber array. The HOM-filter fibers can also span the full distance between connection locations 320 and 330 such that primary MMFs 40 are not part of the fiber assembly 300.

In a preferred embodiment, the system polarity is maintained by defining duplexed pairs of the transmit and receive optical fiber links T and R for fiber assembly 300. These duplexed pairs are denoted in shorthand as (T),(R)→(T,R), wherein the pairings (T,R) of transmit and receive optical fiber links T and R at the left side can be written as (T,R), where T=1 to (N/2) and R=((N/2)+1) to N. This configuration of transmit and receive optical fiber links T and R within fiber assembly 300 reduces manufacturing complexity in instances where performance optimization or cost considerations may dictate the configuration.

It is further disclosed that proper maintenance of system polarity requires that the connectors of trunk 220 be mated to fiber assembly 300 at each end of the trunk in a manner so that each transmit fiber of fiber array 310T on each end of the trunk 220 is placed in optical communication with a receive fiber of fiber array 310R on the other end of the trunk and that the fiber paths so formed should be paired at each end as described above.

As an example, for a 24-fiber trunk 220 of FIG. 8A having two legs 220L on each end, each leg terminated with a 12-fiber MPO connector and subsequently mated on each end to a fiber assembly embodying the schematic diagram 300 of FIG. 8B and where 332T and 332R are 12-fiber MPO style connectors, the desired polarity can be achieved by orienting and terminating the fibers of each trunk leg 220L on one end of the trunk into the MPO connectors in a forward fiber order from 1 to 12 and orienting and terminating the fibers of each trunk leg 220L on the other end of the trunk into the MPO connectors in a reverse fiber order from 12 to 1. The trunk leg 220L mated to connector 332T at one end of the trunk and the trunk leg 220L mated to connector 332R at the other end of the trunk must be in optical communication with one another.

Aspects of the disclosure include providing HOM-filter fiber 110 in one or more of the components of system 100, e.g., in jumpers 250 at one or both ends of the system; in breakout module 200; in breakout harness 270; in fiber assembly 300; in connectors used anywhere along the optical path to establish an optical connection for the optical path; or in a combination of these components. Likewise, aspects of the disclosure include providing HOM-filter fiber 110 at one or both ends of a given primary MMF 40, as shown in the embodiments of FIGS. 2A through 2C. The relatively short length $L_F$ of HOM-filter fiber 110 as compared to the length of the primary MMF 40 allows for one or more of the HOM-filter fibers to constitute relatively small portions of the optical path, such as small enough to fit at least partially within or entirely within the aforementioned connectors. When convenient, the length $L_F$ of HOM-filter fiber 110 can be made longer than 2 cm, e.g., it can be a meter or many meters long.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical transmission system for transmitting data, comprising:
    a transmitter that generates modulated light having a wavelength between 800 nm and 1600 nm, wherein the transmitter has an emission surface with a center and an outer edge and a spatially non-uniform light emission;
    an optical receiver configured to receive and detect the modulated light;
    a multimode optical fiber link that optically connects the transmitter and the optical receiver, wherein the multimode optical fiber link includes a primary multimode fiber having a refractive index profile configured to optimally transmit light at a peak wavelength and having a diameter $D_{40}$, wherein the wavelength of the modulated light is within 150 nm of the peak wavelength; and
    at least one higher-order-mode (HOM)-filter fiber optically connected the primary multimode optical fiber and having a length of at least 5 mm, and a core diameter $D_C$ and wherein $0.6 \cdot D_{40} \leq D_C \leq 0.95 \cdot D_{40}$, and having a relative refractive index $\Delta$ in the range between 0.5% and 2%, wherein the HOM-filter fiber gives rise to an optical loss of 1 dB or less and an increase in modal bandwidth of up to 50% at the wavelength of the modulated light as compared to using only the primary multimode fiber at the wavelength of the modulated light.

2. The optical transmission system according to claim 1, wherein either $D_{40}$=50 μm or $D_{40}$ is in the range 55 μm≤$D_{40}$≤125 μm.

3. The optical transmission system according to claim 2, wherein $D_{40}$=50 μm and 35 μm<$D_C$<45 μm.

4. The optical transmission system according to claim 2, wherein $D_{40}$=62.5 μm and 45 μm<$D_C$<58 μm.

5. The optical transmission system according to claim 1, wherein the wavelength of the modulated light generated by the transmitter is nominally 850 nm, 1060 or 1310 nm.

6. The optical transmission system according to claim 1, wherein the multimode optical fiber link comprises a breakout module or a breakout harness having a fiber array that includes a section of the multimode optical fiber, and wherein the at least one HOM-filter fiber is operably attached to the multimode optical fiber section.

7. The optical transmission system according to claim 1, wherein the multimode optical fiber link comprises at least one jumper having a section of the multimode optical fiber, and wherein the at least one HOM-filter fiber is operably attached to the multimode optical fiber section.

8. The optical transmission system according to claim 1, wherein the multimode optical fiber link includes a stub fiber connector, wherein stub fiber is made of the HOM-filter fiber.

9. The optical transmission system according to claim 1, further including a data rate of at least 25 Gb/s.

10. The optical transmission system according to claim 1, where the at least one HOM-filter fiber includes a single HOM filter fiber operably arranged between the multimode fiber and the receiver.

11. The optical transmission system according to claim 1, wherein the transmitter includes either silicon-photonics light source or a vertical-cavity surface-emitting laser (VCSEL) light source.

12. The optical transmission system according to claim 1, wherein the wavelength of the modulated light is substantially the same as the peak wavelength.

13. An optical transmission system for transmitting data, comprising:
- a transmitter that includes light source that generates modulated light having a wavelength between 800 nm and 1600 nm, wherein the light source has a spatially non-uniform light emission;
- an optical receiver that includes a photodiode configured to receive and detect the modulated light;
- a multimode optical fiber link that optically connects the light source and the photodetector, wherein the multimode fiber link includes a primary multimode optical fiber having a refractive index profile configured to optimally transmit light at a peak wavelength and having a diameter $D_{40}$ and configured to transmit the modulated light, wherein the wavelength of the modulated light is within 150 nm of the peak wavelength; and
- at least one higher-order-mode (HOM)-filter fiber optically connected to the primary multimode optical fiber and having a length of at least 5 mm, a core diameter $D_C$ wherein $0.6 \cdot D_{40} \leq D_C \leq 0.95 \cdot D_{40}$, and a relative refractive index $\Delta$ in the range between 0.5% and 2%, wherein the HOM-filter fiber gives rise to an optical loss of 1 dB or less and an increase in modal bandwidth of up to 50% at the wavelength of the modulated light as compared to using only the multimode optical fiber at the wavelength of the modulated light.

14. The optical transmission system according to claim 13, wherein the at least one HOM-filter fiber resides at least partially within a least one of the receiver and the transmitter.

15. The optical transmission system according to claim 13, wherein the primary multimode optical fiber comprises at least a portion of either: a jumper cable, a stub-fiber connector, a break-out harness or a break-out module.

16. The optical transmission system according to claim 13, wherein the light source is either a silicon-photonics light source or a vertical-cavity surface-emitting laser (VCSEL) light source.

17. A method of transmitting optical signals over an optical path of an optical transmission system, comprising:
- using a transmitter, generating modulated optical signals at a wavelength in a range between 800 nm and 1600 nm, wherein the transmitter has an emission surface with a center and an outer edge and a spatially non-uniform light emission;
- transmitting the optical signals over a primary multimode optical fiber having a refractive index profile configured to optimally transmit light at a peak wavelength, wherein the wavelength of the modulated optical signals is within 150 nm of the peak wavelength, and wherein the primary multimode fiber has a diameter $D_{40}$ of either 50 μm or 55 μm $\leq D_{40} \leq$ 125 μm, and wherein some of the optical signals travel in the primary multimode fiber as higher-order modes (HOMs);
- performing filtering of the HOMs using at least one HOM-filter fiber attached to the primary multimode fiber, wherein the at least one HOM-filter fiber has a core diameter $D_C$ in the range $0.6 \cdot D_{40} \leq D_C \leq 0.95 \cdot D_{40}$, a length LF in the range from 5 mm $\leq L_F \leq$ 2 m, and a relative refractive index $\Delta$ in the range between 0.5% and 2%, wherein the at least on HOM-filter fiber gives rise to an optical loss of 1 dB or less and an increase in modal bandwidth of up to 50% at the wavelength of the modulated optical signals as compared to using only the primary multimode optical fiber at the wavelength of the modulated optical signals; and
- receiving the transmitted and HOM-filtered optical signals at a receiver.

18. The method according to claim 17, wherein the transmitter includes either silicon-photonics light source or a vertical-cavity surface-emitting laser (VCSEL) light source.

19. The method according to claim 17, wherein the primary multimode fiber is part of: a breakout module, a breakout harness, a jumper cable, or a stub-fiber connector for which the at least one HOM-filter fiber comprises a stub fiber.

20. The method according to claim 17, wherein performing the HOM-filtering includes operably arranging a single section of HOM-filter fiber either immediately adjacent the receiver or immediately adjacent a photodetector within the receiver.

21. The method according to claim 17, wherein performing the HOM-filtering includes operably arranging a single section of HOM-filter fiber either immediately adjacent the transmitter or within the transmitter and immediately adjacent a light source within the transmitter.

22. The method according to claim 17, wherein the peak wavelength is substantially the same as the wavelength of the modulated optical signals generated by the transmitter.

\* \* \* \* \*